United States Patent [19]

Maeda

[11] Patent Number: 5,283,778
[45] Date of Patent: Feb. 1, 1994

[54] PICKUP DEVICE

[75] Inventor: Takanori Maeda, Saitama, Japan

[73] Assignee: Pioneer Electronic Corporation, Tokyo, Japan

[21] Appl. No.: 886,852

[22] Filed: May 22, 1992

[30] Foreign Application Priority Data

Nov. 12, 1991 [JP] Japan .................................. 3-295410

[51] Int. Cl.⁵ ............................................... G11B 7/00
[52] U.S. Cl. .................................... 369/112; 369/116; 369/121
[58] Field of Search .................... 369/93, 120, 128, 43, 369/44.11, 112, 120, 110, 100, 116, 121, 131, 44.23, 109

[56] References Cited

U.S. PATENT DOCUMENTS

| | | | |
|---|---|---|---|
| 4,510,544 | 4/1985 | Lazzari | 360/114 |
| 4,550,249 | 10/1985 | Damen et al. | 369/44 |
| 5,038,332 | 8/1991 | Sakagami et al. | 369/275.3 |
| 5,081,617 | 1/1992 | Gelbart | 369/112 |
| 5,113,386 | 5/1992 | Whitehead et al. | 369/44.11 |
| 5,132,953 | 7/1992 | Matsubayashi | 369/44.11 |
| 5,144,603 | 9/1992 | Mozume et al. | 369/112 |

FOREIGN PATENT DOCUMENTS

| | | |
|---|---|---|
| 0376626A2 | 7/1990 | European Pat. Off. . |
| 0393719A2 | 10/1990 | European Pat. Off. . |
| 0418879A2 | 3/1991 | European Pat. Off. . |
| 52-50131 | 12/1977 | Japan . |
| 5258248 | 4/1982 | Japan . |
| 58-29154A | 2/1983 | Japan . |

OTHER PUBLICATIONS

European Search Report dated Mar. 31, 1993.
Patent Abstract of Japan, vol. 19, No. 155 (P-12) Apr. 7, 1982.

Primary Examiner—Paul M. Dzierzynski
Assistant Examiner—Don Wong
Attorney, Agent, or Firm—Finnegan, Henderson, Farabow, Garrett & Dunner

[57] ABSTRACT

A pickup device can detect the frequency (pit length) recorded in the recording medium, and read out data signals from the optical disk at high S/N. Further, the data read speed is considerably increased since it is possible to concurrently read data signals from the tracks. In a pickup device, a linear light beam emitted from a light source is projected onto an optical disk through a condenser lens so as to form an image thereon, which is long enough to cover three recording tracks on a recording medium. Signal light reflected on the recording medium is imaged on a photo detector consisting of an array of detecting elements, and is detected and output by and from the photo detector. A frequency analyzer unit analyzes the frequencies of the detected signals. A computing circuit calculates the output values for each analyzed frequency. Accordingly, it is possible to separate the frequencies of the recording tracks from each other.

4 Claims, 5 Drawing Sheets

PICKUP DEVICE

BACKGROUND OF THE INVENTION

The present invention relates to a pickup device for reproducing information recorded on an optical disk used as an optical recording medium for recording information such as video signals. More particularly, the invention relates to pickup device having an improved signal reproduction characteristic.

The optical disk based on the laser technology has been known as a large capacity recording medium for storing large lo amount of information, such as digital data signals and analog data signals, e.g., video data signals. The reproduction system for reproducing information from an optical disk which has been used prevalently is of the reflection type in which a laser beam reflected on the recording surface of the optical disk is used for data reproduction. The reason why this type of data reproduction system is widely used is that it is easy to manufacture and simple in construction, and allows reduction of the size of the drive system.

The optical disk of the reflection type is classified into an optical disk of the reproduction only type, an optical disk of the additive recording type, and an optical disk of the rewritable type. A series of pits, representative of data signals to be recorded, are spirally formed on the recording surface of the optical disk from the inner side of the disk toward the outer side. One turn of the series of pits as unit data forms one recording track. To reproduce the data of the pits, the positioning of the pickup device is carried out for each track. The term "pit" generally refers to a hole or cavity. In the description to follow, for ease of explanation, the term "pit" also means data recording modes in which data is recorded without any change in the shape of the disk, such as magnetic-optical recording mode and phase change recording mode.

Figure 7:
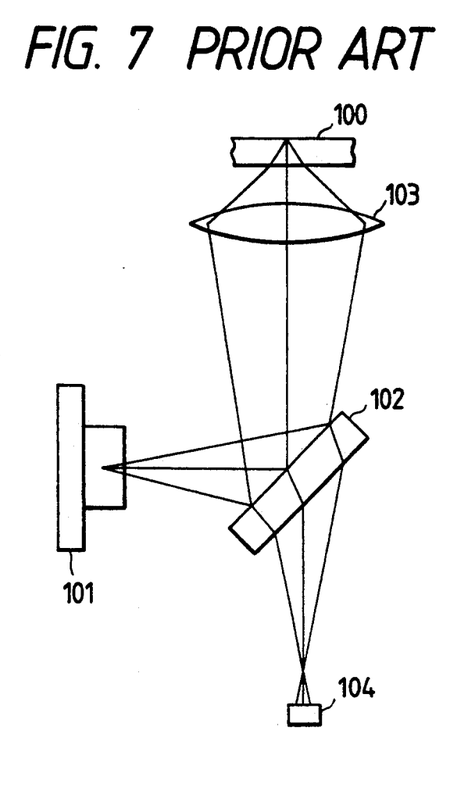
FIG. 7 is a diagram roughly showing the construction of a prior pickup device.

FIG. 7 is an explanatory diagram showing the scheme of a prior art pickup device. In the figure, reference numeral 101 designates a semiconductor laser device having a traverse single mode. The laser device serves as a point light source having a light emitting point of approximately 0.1 μm in diameter. Numeral 102 represents a half mirror for separating a light beam projected onto an optical disk 100 and the reflected light beam from the optical disk 100. Numeral 103 designates an objective lens, and numeral 104 indicates a photo detector for detecting the reflected light beam. In operation, the light radiating from the laser device 101 is reflected by the half mirror 102, and is focused on the recording surface of the optical disk 100 through the objective lens 103. In this case, the wave length λ of the light source and the numerical aperture NA of the objective lens 103 are selected to be λ/NA>0.1 μm. Accordingly, the so-called "diffraction limit" acts to limit the size of the light spot on the disk to λ/NA.

As already described, data signals are recorded in the optical disk 100 in the form of a series of pits whose nature is optically changed. An optical disk of the type in which portions of different reflectivities is formed therein will be described. In this type of the optical disk, data signals are recorded into the disk by forming portions of different reflectivities. To form the portions of different reflectivities, coloring matter previously mixed into the record film of the disk is exposed to light, or the record film is placed to a crystalline state or an amorphous state. Intensities of the laser beams reflected from the optical disk 100 are modulated according to the different reflectivities on the optical disk 100, and are concentrated again by the objective lens 103. Part of these laser beams pass through the half mirror 102. By the astigmatism faculty of the half mirror 102, the laser beams are spread out with respect to the optical axis to have different focal positions as viewed in the vertical and horizontal directions. The photo detector 104 is located at the mid-point between the two different focal positions.

Figure 8A:
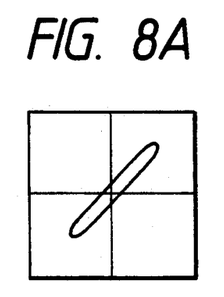
FIGS. 8A to 8C are diagrams showing the shapes of a light spot on the photo detector of the prior pickup device.
Figure 8B:
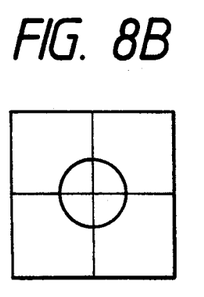
Figure 8C:
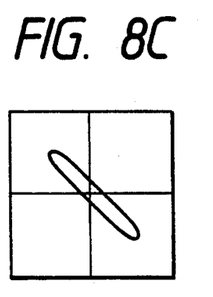

The photo detector 104 may be constructed with a quartered photo diode array, as shown in FIGS. 8A to 8C. The photo detector 104 is positioned in that at a far focal position, the light spot is shaped in cross section as shown in FIG. 8A; at a near focal position, it is shaped as shown in FIG. 8C; and at the focal position, it is shaped as shown in FIG. 8B. A difference of light intensity between the diagonal line components of light on the photo detector 104 is calculated to obtain the quantity of defocus. The focal position is controlled on the basis of the defocus quantity. In this case, the light spot projected on the optical disk 100 is not focused on the detect surface of the photo detector 104, but it is detected in a state that it is displaced by the half of the focal position difference, viz., in the so-called far field pattern. Meanwhile, in Examined Japanese Patent Publication (Kokoku) Sho-52-50131 (the first prior art document), there is disclosed a technique in which the signal is detected at the focal position. The technique is able to minimize the light spot movement on the photo detector.

A high density read method is proposed in Unexamined Japanese Patent Publication (Kokai) Sho-57-58248 (the second prior art document). In the proposal, a plurality of light sources are provided. Three recording tracks are radiated with light beams from those light sources. Far field patterns of the light sources are detected by the photo detector. The output signals of the photo detector are subtracted from one another according to the leakage rates previously measured, thereby to reduce the quantity of signal leakage such as crosstalk.

In the pickup device of the first prior art, in the case where a record density on the optical disk is increased by reducing the track-to-track distance without changing the wavelength of light from the light sources and the numerical aperture, the light spot must be influenced by changes of the reflectivities of the tracks adjacent thereto. Accordingly, when the signal is read out, much leakage from the adjacent tracks is mixed into the readout signal. This leads to degradation of S/N ratio performance.

In the second prior art document, it is necessary to form a light spot by the diffraction limit. When the track-to-track space is made to be narrower than the spot diameter, the influence by the adjacent tracks will be created. Thus, it can not be expected large effect.

SUMMARY OF THE INVENTION

The present invention has been made to solve the problems of the prior art as stated above, and has as an object to provide a pickup device which can read data at a high S/N ratio from an optical disk recorded information at a high record density, and can simultaneously read data from a plurality of tracks, realizing a high speed read operation.

According to the present invention, there is provided a pickup device for optically reading data from a plurality of recording tracks on the recording surface of a recording medium, comprising: a light source including a unitary linear light emitting part arrayed perpendicular to the direction of the plurality of recording tracks, the light source emitting a unitary linear light beam, shaped linear in cross section, from the light emitting part; a condenser lens for condensing the linear light beam emitted from the light source and projecting the same on the recording surface of the recording medium at such a magnification as to form a unitary light beam spot thereon long enough to range over a plurality of recording tracks on the recording medium, and the condenser lens receiving, as signal light, the light reflected by the recording surface of the recording medium and the lens emitting the same; a photo detector including a plurality of detecting elements, the photo detector being disposed at a place where a line image by the signal light emitted from the condenser lens is formed, and the photo detector detecting the signal light returned from the plurality of recording tracks with the plurality of detecting elements; a frequency analyzing circuit for analyzing the frequencies of detect signals output from the detecting elements of the photo detector; and a computing circuit for computing the signals frequency-analyzed every frequency thereby to produce output values.

With such a construction, a unitary light beam emitted from a light source is projected onto a recording medium through a condenser lens so that a unitary light beam spot formed thereon by the unitary light beam is long enough to cover three recording tracks of the recording medium. Signal light reflected by the recording medium is imaged on a photo detector consisting of an array of detecting elements, and is detected by the photo detector. A frequency analyzer unit analyzes the frequencies of the electrical signals output from the photo detector. A computing circuit computes the output values for each analyzed frequency. Accordingly, the frequencies of the recording tracks can be separated from each other. The pickup device can detect the frequency (pit length) recorded in the recording medium, and read out data from the optical disk at high S/N. Further, the data read speed is considerably increased since it is possible to concurrently read data signals from the tracks.

DETAILED DESCRIPTION OF THE PREFERRED EMBODIMENTS

Figure 2:
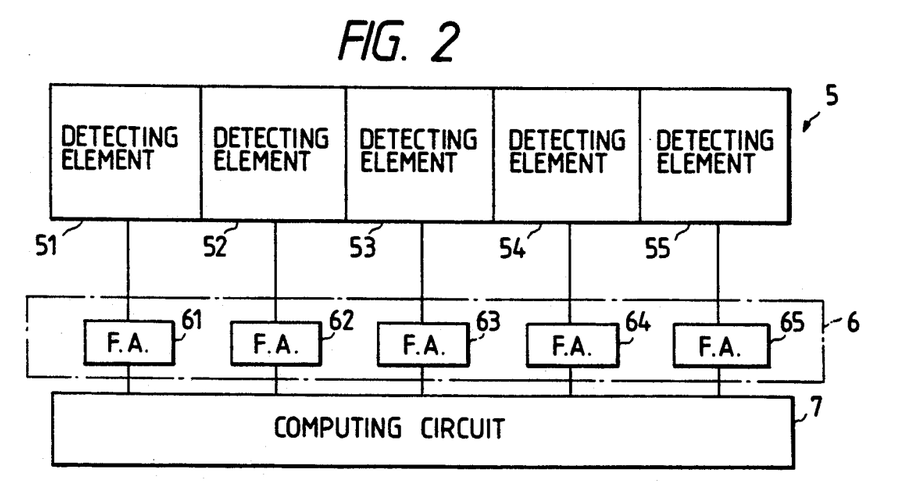
FIG. 2 is a block diagram showing the details of a part of the pickup device shown in FIG. 1.
Figure 3:
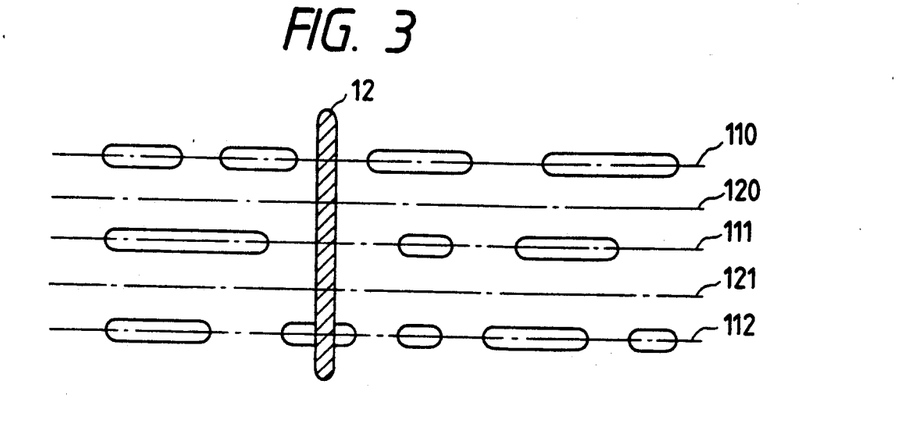
FIG. 3 is a diagram showing various modes of projecting light beams onto an optical disk in the pickup device shown in FIG. 1.

An embodiment of a pickup device according to the present invention will be described with reference to FIGS. 1 through 3.

Figure 1:
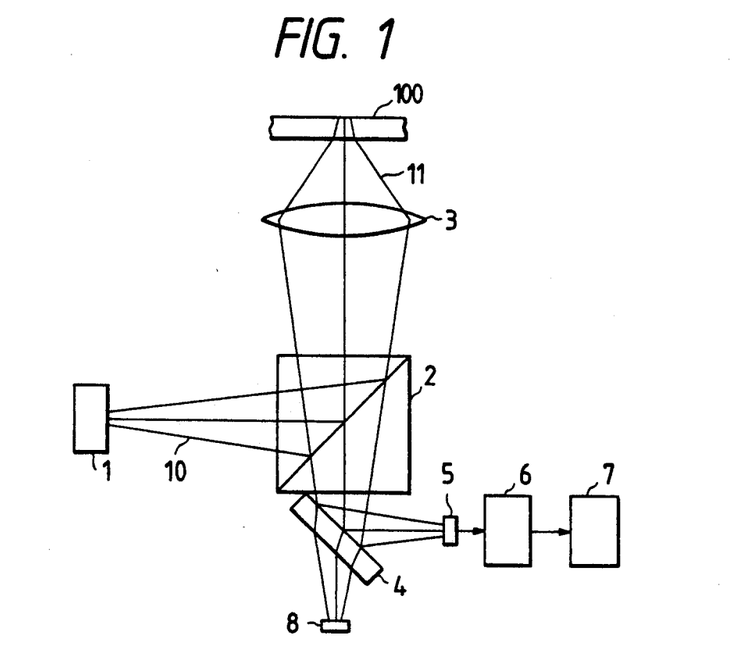
FIG. 1 is a diagram roughly showing the construction of a pickup device according to an embodiment of the present invention.

FIG. 1 is an explanatory diagram showing the construction of a pickup device according to a first embodiment of the present invention. FIG. 2 is a block diagram showing the details of a portion of the pickup device. FIG. 3 is a diagram showing various modes of projecting light beams onto an optical disk.

In the figures, the pickup device according to the present invention is made up of a light emitting diode 1, a beam splitter 2, an objective lens 3, a parallel plate 4, a photo detector 5, a frequency analyzer unit 6, a computing circuit 7, and a servo photo detector 8. The light emitting diode 1 serves as a light source for emitting a unitary linear light beam 10 which is shaped linear in cross section. The beam splitter 2 projects the unitary linear light beam 10 toward an optical disk 100 and separates the reflected light from the optical disk 100 from the incident, unitary linear light beam. The objective lens 3 converges the linear light beam 10 from the beam splitter 2 to form a unitary light beam spot of such a length as to cover three adjacent recording tracks on the recording surface of the optical disk 100, and converges signal light beams as the reflected light beams from the recording surface of the optical disk 100, thereby to form an image through the beam splitter 2. The parallel plate 4 is disposed slanted toward the light emitting side of the beam splitter 2 from which the signal light is emitted. The plate 4 reflects part of the signal light and allows the remaining part of the signal light to pass therethrough. The signal light, when passing through the plate 4, experiences an astigmatism. The photo detector 5 is provided for detecting the signal light reflected by the parallel plate 4. The frequency analyzer unit 6 analyzes the frequencies of signals output from the photo detector. The computing circuit 7 computes signal levels of the tracks by using the analyzed frequencies. The servo photo detector 8 receives the signal light after astigmatism processed by the plate 4, in the far field pattern, and generates a servo control signal.

The photo detector 5 includes five detecting elements 51 to 55 disposed side by side at the locations (on the focal plane of the objective 3) where the unitary linear images are formed by signal light returned from the three tracks through the route of the objective lens 3, beam splitter 2, and parallel plate 4. The detecting elements 51 to 55 of the photo detector 5, respectively, detect signal light at the positions of the recording tracks 110 to 112 and two lines 120 and 121 each lying between the two adjacent tracks. The frequency analyzer unit 6 includes five analyzers 61 to 65, which are respectively associated with the five detecting elements 51 to 55, and detect the frequencies of the detect signals from the detecting elements 51 to 55.

The length of each linear-light-beam emitting part in the light emitting diode 1 is selected such that a unitary light beam spot, which is formed on the optical disk 100 according to the magnification of the objective lens 3, ranges over three tracks on the optical disk 100. The unitary linear light beam emitted from the light emitting diode 1 is projected onto the optical disk 100 as shown in FIG. 3. The spread of the unitary linear light beam in the direction along the data track is limited by the refraction limit.

The operation of the pickup device thus constructed will be described.

The light emitting diode 1 emits a unitary linear light beam. The unitary linear light beam is reflected by the beam splitter 2, and then with the objective lens 3 is imaged on the recording surface of the optical disk 100 as shown in FIG. 3. The unitary linear light beam 12 is reflected on the recording surface, travels through the route of the objective 3, beam splitter 2, and parallel plate 4, and reaches the servo photo detector 8. The detector detects the unitary linear light beam to produce control signals for both focus servo and tracking servo. Under control of these control signals, the focal position and tracking position are corrected thereby removing error components contained therein. Following this, data is read out of a specific track. Known focus servo and tracking servo controls are available for those controls of the embodiment, and hence no further description of them will be given here.

A unitary light beam spot that the unitary linear light beam forms on the recording surface of the optical disk 100, undergoes different reflectivities. Assuming that $F(x, y)$ represents an intensity distribution of the line image that is formed on the disk 100 by the unitary linear light beam, and $d(u, v)$ is the pupil, an intensity distribution $F'(x, y)$ on the detecting surface of the photo detector 5 is expressed by $$F'(x,y) = \int\int_{-\infty}^{\infty} d(u,v) \int\int_{-\infty}^{\infty} F(x,y)e^{\{-2\pi i(ux+vy)\}}dxdy \times e^{\{2\pi i(ux+vy)\}}dudv \quad \text{[Formula 1]}$$

Figure 4A:
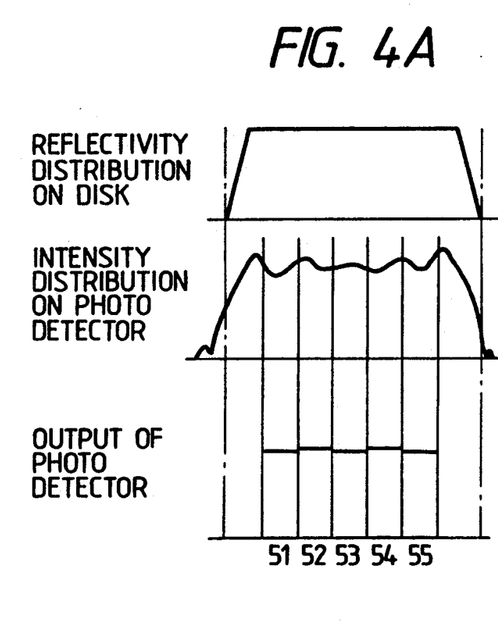
FIGS. 4A to 4D are graphs showing profiles of relationships between a reflectivity distribution on an optical disk and the output signals of a photo detector in the pickup device shown in FIG. 1.
Figure 4B:
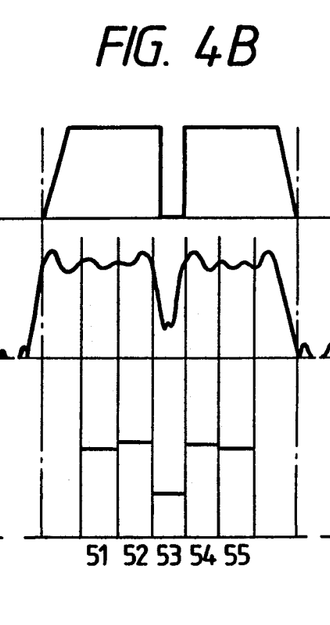
Figure 4C:
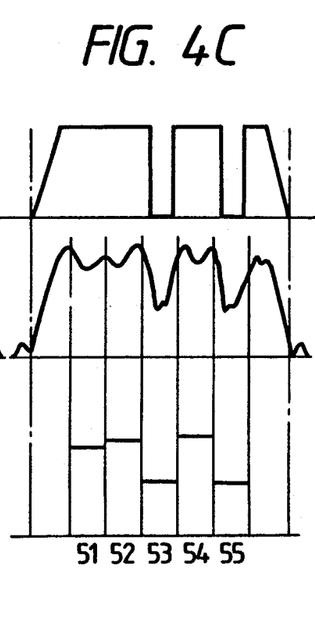
Figure 4D:
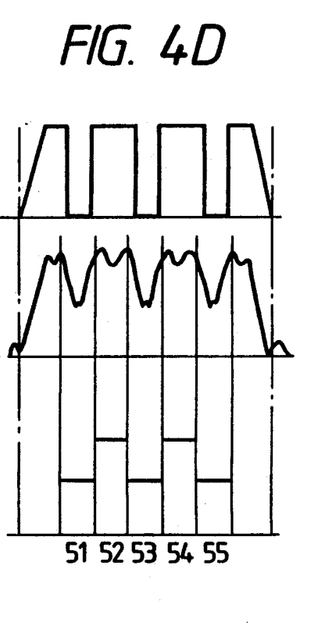

From the above formula, relationships between a reflectivity distribution on the optical disk 100 and the output signals of the photo detector 5 can be diagrammatically expressed as shown in FIGS. 4A to 4D. FIG. 4A shows a profile of the relationship when pits of low reflectivities are not present in the three tracks. FIG. 4B shows a profile of the relationship when of the three tracks, only the middle track has a pit. FIG. 4C shows a profile of the relationship when the middle and right tracks have pits. FIG. 4D shows a profile of the relationship when the three tracks have all pits. The relationships between the reflectivity distribution on the optical disk 100 and the intensity distribution on the detecting surface (image focusing plane) of the photo detector 5 in the above respective cases are also profiled.

The detecting elements 51 to 55 of the photo detector 5 detect signal light beams according to the profile of the intensity distribution, and output detect signals having values as illustrated in the lower part in FIG. 4A through 4D. The frequencies of the detect signals output from the detector are analyzed by the frequency analyzer unit 6. On the basis of the analyzed frequencies the computing circuit 7 calculates the signal levels of the respective tracks.

The operation of the pickup device in a case where the optical disk 100 is rotated, and three signals of frequencies (lengths of recording pits) f1, f2, and f3 are recorded in the recording tracks 110, 111, and 112 of the disk, will be described with reference to FIGS. 5A to 5D, 6A and 6B.

Figure 5A:
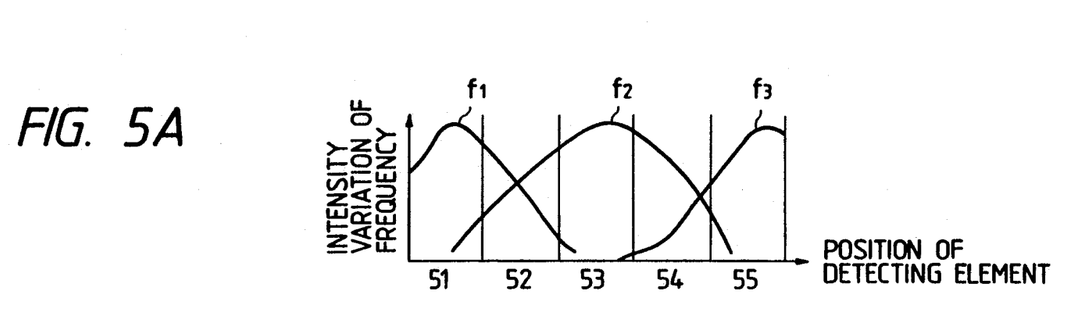
FIGS. 5A to 5D are graphs showing the frequency characteristics and output characteristics of the photo detectors, both corresponding to the respective tracks, in the pickup device shown in FIG. 1.
Figure 5B:
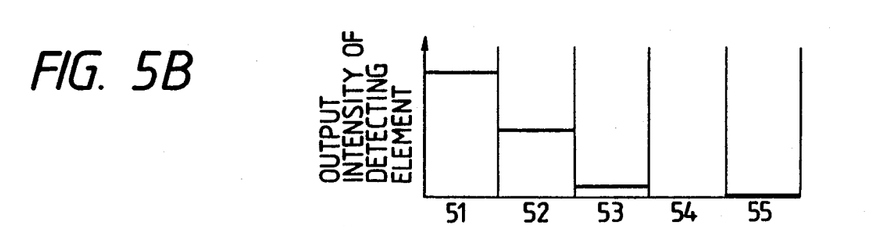
Figure 5C:
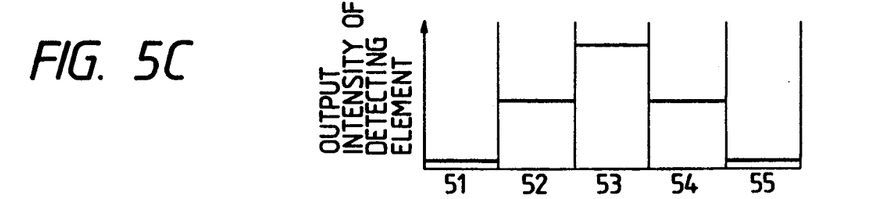
Figure 5D:
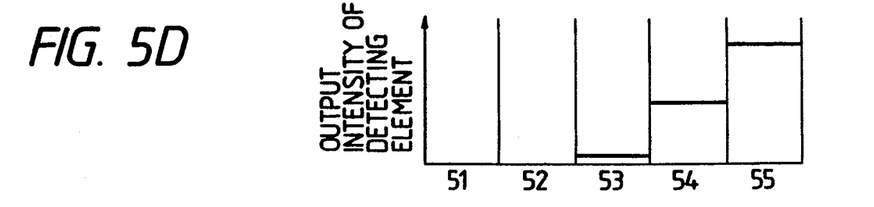
Figure 6A:
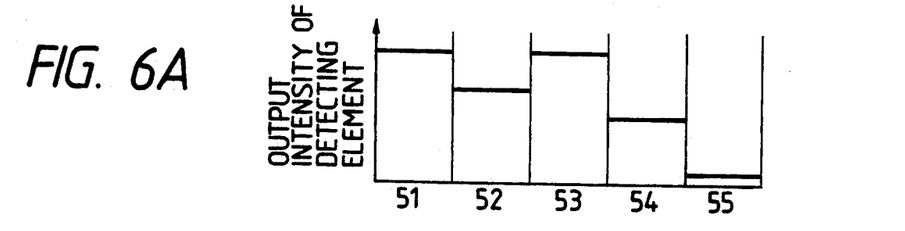
FIGS. 6A and 6B are graphs showing the output characteristics of the photo detectors corresponding to the recording tracks in the pickup device shown in FIG. 1.
Figure 6B:
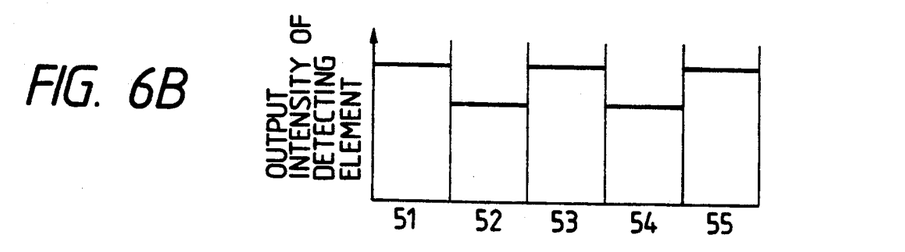

In this case, the signals output from the photo detector 5, when it receives light beams from the recording tracks 110, 111, and 112, are profiled as shown in FIGS. 4A to 4D. Accordingly, a frequency distribution profile on the detecting surface of the photo detector 5 is as shown in FIG. 5A. The frequency analyzer unit 6 and the computing circuit 7 examine the frequency distributions on the detecting elements 51 to 55. The intensity distributions of the frequencies f1 to f3 are respectively profiled as shown in FIGS. 5B to 5D. From the intensity distributions, the frequencies f1, f2, and f3 recorded in the tracks 110, 111, and 112 can be known through the computing circuit 7. A profile of the intensity distribution when the frequency f1 is recorded in two recording tracks is as shown in FIG. 6A. A profile of the intensity distribution when it is stored in three recording tracks is as shown in FIG. 6B. Accordingly, the frequencies of the tracks 110, 111, and 112 can be separated from each other. In this way, the frequencies, or the pitch lengths, recorded in the optical disk 100 can be detected. The individual signals of the recording tracks 110, 111, and 112 are produced by the computing circuit 7.

The light source used in the embodiment as mentioned above is the light emitting diode, not the laser resonator. Accordingly, an optical integrated circuit for the pickup device can be easily fabricated at low cost.

In the aforementioned embodiment, a line image is projected onto the optical disk to form a unitary light beam spot thereon long enough to cover three recording tracks, and the images on these tracks are respectively detected. If required, the unitary light beam spot may be formed so as to cover two adjacent tracks. In the aforementioned embodiment, the detecting elements are allocated one for the two adjacent recording tracks. The detecting elements may be further increased, if necessary, for the same purposes. For example, the number of detecting elements may be selected to be larger than $(2xn-1)$, where n is the number of recording tracks the beam spot crosses. The increased number of detecting elements will provide a more accurate signal read, because the detected signal determination is based on the output signals of those detecting elements.

A semiconductor laser may be used in place of the light emitting diode, which is used for the unitary linear light source in the first embodiment In this case, a point light source of the semiconductor laser is shaped into a line image. Since the image formed on the optical disk is a coherent image, the intensity distribution on the photo detector is different from that formed by the light emitting diode. The computing process altered so as to be adapted for the intensity distribution by the laser beam will not create any problem.

The invention has been described by using the so-called amplitude grating where data pits are recorded in the form of different reflectivities. It is evident that the invention may be applied to the phase grating where the data pits are recorded in the form of different depths. Also in this case, an intensity distribution of the received signal light on the photo detector is different from that formed in the amplitude grating. A computing process based on a distribution pattern previously obtained through the calculation or the experiment will not create any problem if the distribution difference exists.

In the aforementioned embodiment, the signal is detected at the image forming position of the objective. For the signal detection, the image formation only in the distributed direction of a line image is required. Then, the signal can be detected at one of the focal positions of the light beam after it the astigmatism. In this case, the image formed on the photo detector is circular or elliptic, not linear.

In the embodiment, the plurality of the detecting elements of the photo detector, which are disposed corresponding to the recording tracks, are determined before the data processing. The embodiment may be modified such that the computing circuit decides the positions of the tracks before its processing, eliminating the adjustment of the photo detector in the lateral direction. When the optical disk becomes eccentric and part of data is missed, if the missed data is stored into a memory, and the number of tracks that can be detected by the computing circuit, no tracking control is required.

The embodiment divides the signal light reflected by the disk to form the tracking and focus servo control signals. Many other methods are available for the same controls. One example is to use a photo detector capable of producing signals of high level. Another example is to use the light reflected by the photo detector.

In the embodiment, the photo detector consists of an array of detecting elements allowing a parallel read of data signals, such as an array of photo diodes. Alternatively, a time-divisional, serial data read is possible. In the alterative, the switching speed must be higher than the signal frequency. It can be realized using an analog filter or the technique known as a digital filtering with reading the signal repeatedly at high frequency.

As described above, a unitary linear light beam emitted from a light source is projected onto a recording medium through a condenser lens so that a unitary light beam spot formed thereon by the unitary linear light beam is long enough to cover three recording tracks of the recording medium. Signal light reflected by the recording medium is imaged on a photo detector consisting of an array of detecting elements, and is detected by the photo detector. A frequency analyzer unit analyzes the frequencies of the electrical signals output from the photo detector. A computing circuit computes the output values for each analyzed frequency. Accordingly, the frequencies of the recording tracks can be separated from each other. The pickup device can detect the frequency (pit length) recorded in the recording medium, and read out data from the optical disk at high S/N. Further, the data read speed is considerably increased since it is possible to concurrently read data signals from the tracks.

What is claimed is:

1. A pickup device for optically reading data from a plurality of recording tracks on a recording surface of a recording medium, the pickup device comprising:
   a light source including a linear light emitting part arranged orthogonal with respect to the direction of an array of data stored in the plurality of recording tracks, said light source emitting a unitary linear light beam, shaped linear in cross section, from said light emitting part;
   a condenser lens for condensing the linear light beam emitted from said light source and projecting the light beam on the recording surface of the recording medium at a magnification to form a unitary light beam spot on the recording medium which is long enough to range over a plurality of recording tracks on the recording medium, said condenser lens receiving and emitting, as signal light, light reflected by the recording surface of the recording medium;
   a photo detector including a plurality of detecting elements, said photo detector being disposed at a position where the signal light emitted from said condenser lens forms a line image corresponding to the beam spot, and said photo detector detecting the signal light returned from the plurality of recording tracks with said plurality of detecting elements;
   a frequency analyzing circuit for analyzing frequencies of detect signals output from said detecting elements of said photo detector; and
   a computing circuit for computing signal levels based on the analyzation performed by said frequency analyzing circuit in order to produce output values.

2. A pickup device for optically reading data from a plurality of recording tracks on a recording surface of a recording medium, the pickup device comprising:
   a light source including a linear light emitting part arranged orthogonal with respect to the direction of an array of data stored in the plurality of recording tracks, said light source emitting a unitary linear light beam, shaped linear in cross-section, from said light emitting part;
   a condenser lens for condensing the linear light beam emitted from said light source and projecting the light beam on the recording surface of the recording medium at a magnification to form a unitary light beam spot on the recording medium which is long enough to range over a plurality of recording tracks on the recording medium, said condenser lens receiving and emitting, as signal light, light reflected by the recording surface of the recording medium;
   a photo detector including a plurality of detecting elements, said photo detector being disposed at a position where the signal light emitted from said condenser lens forms a line image corresponding to the beam spot, and said photo detector detecting the signal light returned from the plurality of recording tracks with said plurality of detecting elements;
   a frequency analyzing circuit for analyzing frequencies of detect signals output from said detecting elements of said photo detector; and
   a computing circuit for computing signal levels based on the analysis performed by said frequency analyzing circuit in order to produce output values;
   wherein the detecting elements are arranged in a longitudinal direction with respect to the beam spot formed by the signal light, and the number of said detecting elements is larger than $(2xn-1)$, where n is the number of recording tracks the beam spot ranges over.

3. A pickup device for optically reading data from a plurality of recording tracks on a recording surface of a recording medium, the pickup device comprising:
   a light source including a linear light emitting part arranged orthogonal with respect to the direction of an array of data stored in the plurality of recording tracks, said light source emitting a unitary linear light beam, shaped linear in cross section, from said light emitting part;

a condenser lens for condensing the linear light beam emitted from said light source and projecting the light beam on the recording surface of the recording medium at a magnification to form a unitary light beam spot on the recording medium which is long enough to range over a plurality of recording tracks on the recording medium, said condenser lens receiving and emitting, as signal light, light reflected by the recording surface of the recording medium;

a photo detector disposed at a position where the signal light emitted from said condenser lens forms a line image corresponding to the beam spot, and said photo detector time-divisional detecting the signal light returned from the plurality of recording tracks in such a manner that a switching speed of said photo detector is higher than signal frequency;

a frequency analyzing circuit for analyzing frequencies of detect signals output from said photo detector; and a computing circuit for computing signal levels based on the analyzation performed by said frequency analyzing circuit in order to produce output values.

4. A pickup device for optically reading data from a plurality of recording tracks on a recording surface of a recording medium, the pickup device comprising:

light source means for emitting a unitary linear light beam;

condenser means for condensing the light beam and forming a unitary linear light beam spot on the recording medium long enough to cross over a plurality of recording tracks on the recording medium, said condenser means receiving and emitting, as signal light, light reflected by the recording surface of the recording medium;

a photo detector for detecting the signal light reflected by the recording surface of the recording medium;

a frequency analyzing circuit for analyzing frequencies of signals output by said photo detector; and a computing circuit for producing output values based on the analyzation performed by said frequency analyzing circuit.

* * * * *